(12) United States Patent
Valentini (10) Patent No.: US 10,804,788 B2
(45) Date of Patent: Oct. 13, 2020

(54) ELECTRIC MACHINE HAVING ELECTRIC MOTOR AND GEAR ARRANGEMENT, AND ELECTRIC POWER TOOL HAVING SUCH AN ELECTRIC MACHINE

(71) Applicant: Guido Valentini, Milan (IT)

(72) Inventor: Guido Valentini, Milan (IT)

( * ) Notice: Subject to any disclaimer, the term of this patent is extended or adjusted under 35 U.S.C. 154(b) by 159 days.

(21) Appl. No.: 16/227,808

(22) Filed: Dec. 20, 2018

(65) Prior Publication Data

US 2019/0199190 A1    Jun. 27, 2019

(30) Foreign Application Priority Data

Dec. 21, 2017 (EP) .................................. 17209804

(51) Int. Cl.
*H02K 49/10* (2006.01)
*H02K 7/11* (2006.01)
(Continued)

(52) U.S. Cl.
CPC ........... *H02K 49/102* (2013.01); *B24B 23/02* (2013.01); *B25F 5/001* (2013.01); *H02K 7/11* (2013.01);
(Continued)

(58) Field of Classification Search
CPC ....... H02K 49/102; H02K 1/2753; H02K 7/14
(Continued)

(56) References Cited

U.S. PATENT DOCUMENTS

| 9,203,279 B2 * | 12/2015 | McMullen | ............. H02K 21/14 |
| 2004/0108781 A1 * | 6/2004 | Razzell | .................. H02K 51/00 310/112 |

(Continued)

FOREIGN PATENT DOCUMENTS

| EP | 1843454 A1 | 10/2007 |
| EP | 2745994 A2 | 6/2014 |

(Continued)

OTHER PUBLICATIONS

English language Abstract of WO9823025.
(Continued)

*Primary Examiner* — Jose A Gonzalez Quinones
(74) *Attorney, Agent, or Firm* — Ware, Fressola, Maguire & Barber LLP (57) ABSTRACT

The invention refers to an electric machine (300) and a hand guided and/or hand held electric power tool (1), comprising an electric motor (15), a working element (9) and a gear arrangement functionally located between the motor (15) and the working element (9). The electric motor (15) has a stator (100) with electrical windings (102) and a rotor (104) with permanent magnets (106) mounted thereon. It is suggested that the gear arrangement is a magnetic gear arrangement (20) using magnetic fields to transmit the rotational movement and torque from the motor (15) to the working element (9), the magnetic gear arrangement (20) comprising three components (51, 52, 54) rotatable in respect to one another, with a first component (52) generating a first magnetic field with a first number (n_input) of magnetic pole pairs (56), a second component (54) generating a second magnetic field with a second number (n_output) of pole pairs (58), and a third component (51) having a third number (n_pp) of ferromagnetic pole pieces (50). The rotor (104) of the motor (15) extends in an axial direction beyond the stator (100) of the motor (15). The magnetic pole pairs (56) are provided on the extended part (108) of the rotor (104) in order to make the extended part (108) together with the magnetic pole pairs (56) form the first rotating component (52) of the magnetic gear arrangement (20).

20 Claims, 9 Drawing Sheets

(51) Int. Cl.
*H02K 1/27* (2006.01)
*H02K 15/03* (2006.01)
*B25F 5/00* (2006.01)
*B24B 23/02* (2006.01)
*B23Q 11/00* (2006.01)

(52) U.S. Cl.
CPC ........ *B23Q 11/0096* (2013.01); *H02K 1/2733* (2013.01); *H02K 15/03* (2013.01)

(58) Field of Classification Search
USPC .............................. 310/50, 74, 75 R, 98, 103
See application file for complete search history.

(56) References Cited

U.S. PATENT DOCUMENTS

| | | | | |
|---|---|---|---|---|
| 2011/0012458 | A1* | 1/2011 | Atallah | H02K 7/11 310/103 |
| 2011/0037333 | A1* | 2/2011 | Atallah | H02K 7/11 310/98 |
| 2011/0057456 | A1* | 3/2011 | Atallah | H02K 49/102 290/1 C |
| 2011/0127869 | A1* | 6/2011 | Atallah | H02K 7/11 310/94 |
| 2014/0015362 | A1 | 1/2014 | Cheng | |
| 2015/0037180 | A1* | 2/2015 | Abbott | H02K 49/102 417/420 |
| 2016/0003001 | A1* | 1/2016 | Stinessen | F16K 31/04 166/365 |

FOREIGN PATENT DOCUMENTS

| | | | |
|---|---|---|---|
| WO | 9823025 | A1 | 5/1998 |
| WO | 2016036116 | A1 | 3/2016 |

OTHER PUBLICATIONS

English language Abstract of EP2745994.
English language Abstract of WO2016036116.
English language Abstract of EP1843454.

* cited by examiner

ELECTRIC MACHINE HAVING ELECTRIC MOTOR AND GEAR ARRANGEMENT, AND ELECTRIC POWER TOOL HAVING SUCH AN ELECTRIC MACHINE

The present invention refers to an electric machine, comprising an electric motor, a working element realizing a working movement when the motor is activated, and at least one gear arrangement functionally located between the motor and the working element for transmitting a rotational movement and torque from the motor to the working element in order to realize the working movement. The electric motor has a stator with electrical windings and a rotor with permanent magnets mounted thereon. The invention also refers to a hand held and/or hand guided electric power tool with such an electric machine.

The power tool may be, for example, a drill, a grinder (straight or angle grinder), a sander, a polisher, a glazing machine, a mixer, a screwdriver or the like, only to name a few. Accordingly, working element may be embodied as a drill chuck, a carrier element of a grinder or a backing pad of a sander or a polisher. The working element is embodied to receive and hold a tool accessory for performing a desired work which the power tool is adapted to perform. For instance, the drill chuck may be embodied in order to receive and hold a drill bit of various sizes. The carrier element may be embodied in order to receive and hold a grinding wheel. The backing pad may be embodied to receive and hold a sanding element (e.g. sanding paper, sanding fabric or the like) or a polishing pad (e.g. a foam pad, a wool pad or a microfiber pad).

The working movement performed by the working element and the tool accessory attached thereto is preferably of the rotational type. In particular, it may be a purely rotational movement, a gear driven roto-orbital movement or a random orbital movement. Furthermore, the working movement could also be a (non-rotational) purely orbital movement. With the purely rotational movement the working element rotates about a first rotational axis, which is congruent with a central axis of the working element running through the balance point of the working element. With the roto-orbital and the random-orbital movement the working element performs a first rotational movement about the first rotational axis spaced apart from a second rotational axis of the working element corresponding to the central axis running through the balance point of the working element. Additionally to the first rotational movement, the working element is also rotatable about the second rotational axis. With the roto-orbital movement, the second rotational movement is forced by a gearing mechanism depending on the first rotational movement. For example, for a first rotational movement by 360° (one rotation) about the first rotational axis, the working element may perform a plurality of gear driven second rotational movements about the second rotational axis of approximately 30 to 120 rotations. With the random orbital movement, the working element is freely rotatable about the second rotational axis independently from its rotation about the first rotational axis.

For instance, a drill chuck and a grinder perform a purely rotational movement. A sander and a polisher may perform a purely rotational movement, a roto-orbital or a random orbital movement. An example for an electrically driven random orbital polisher is the BigFoot®-polisher LHR 21ES produced and sold by RUPES S.p.A. from Vermezzo (IT).

In the electric power tools known in the art mechanical gear arrangements are commonly used. The gear arrangements can reduce a first rotational speed of an input shaft (e.g. a motor shaft) into a second rotational speed of an output shaft (e.g. a rotational shaft of the working element), the second speed being smaller than the first speed, thereby generating a larger torque at the output shaft. Furthermore, bevel gear arrangements are used in the known power tools in order to translate a rotational speed and a torque from an input shaft to an output shaft, wherein the rotational axes of the two shafts run in an angle $\alpha$ in respect to one another, wherein the angle may be $180°>\alpha\geq90°$, in order to realize an angular power tool. Finally, as already described above, mechanical gears are used in known roto-orbital power tools for forcing the working element to realize the roto-orbital rotational movement.

Furthermore, from completely different technical fields it is known to use magnetic gear arrangements for transmitting rotational movement and torque between electrical machines (motors or generators) and a load (see for example U.S. Pat. No. 3,378,710). Such magnetic gear arrangements are used in very large appliances, such as conveyer belts, ship propulsions, power generators, wind turbines, large pumps and the like, or in the technical field of aerospace applications, manufacturing of pharmaceuticals or food and other environments with a high hygienic standard.

It is an object of the present invention to improve the known hand guided and/or hand held electric power tools by providing a highly integrated electric machine comprising an electric motor and a magnetic gear arrangement adapted for use in such electric power tools.

In order to find a solution to this problem an electric power tool comprising the features of claim 1 is suggested. In particular, it is suggested that the at least one gear arrangement is embodied as a magnetic gear arrangement using magnetic fields to transmit the rotational movement and torque from the motor to the working element without mechanical contact. The magnetic gear arrangement has three principle components, all three of which may rotate relative to each other about a rotational axis. The three components comprise a first component generating a first magnetic field with a first number of magnetic pole pairs, a second component generating a second magnetic field with a second number of pole pairs, and a third component having a third number of ferromagnetic pole pieces. The third component acts as a passive part of a magnetic circuit between the first and second components. The rotor of the motor extends in an axial direction beyond the stator of the motor, wherein the first number of magnetic pole pairs is provided on the extended part of the rotor in order to make the extended part of the rotor together with the first number of magnetic pole pairs form the first rotating component of the magnetic gear arrangement.

The present invention provides for a highly integrated electric machine comprising an electric motor and a magnetic gear arrangement. The electric motor can be of the outrunner type or of the inrunner type. The magnetic gear arrangement is preferably a coaxial gear arrangement with the input shaft and the output shaft rotating about a common rotational axis. Of course, it would also be possible that the rotational axes of the input and output shafts run parallel to one another. According to the invention the rotor of the electric motor forms or makes part of a rotating first component of the magnetic gear arrangement. By doing so, the rotating first component can be omitted in the electric machine according to the invention. Or with other words, the rotating first component of the magnetic gear arrangement with its first number of magnetic pole pairs forms or makes part of the rotor of the electric motor. By doing so, the rotor of the electric motor can be omitted in the electric machine according to the invention. Therefore, the electric machine is highly integrated, compact, and lightweight.

The power tool according to the invention has the advantage that the power transmission through the magnetic gear arrangement is effected without contact, thereby avoiding noise created by grinding parts of a mechanical gear arrangement.

The power tool according to the present invention uses the magnet fields of powerful permanent magnets for torque transmission between the motor and the working element. The magnetic gear arrangement has no wearing parts and, therefore, does not require oil or grease lubrication, resulting in high reliability, and little or no maintenance. Further, unlike mechanical gear arrangements, magnetic gear arrangements maintain their original performance and efficiency over time, because they are not susceptible to mechanical wear. It is also more efficient than a mechanical gear arrangement as there is no friction from contacting parts. Furthermore, magnetic gear arrangements also protect against overloads by slipping harmlessly if an excessive torque is applied, and automatically and safely re-engaging when the excess torque is removed. This prevents damage of the motor of the power tool and protects users of the tool from accidents and injury due to the tool breaking away in case of applying too much force to the tool by the user.

The inventors have individualized the mechanical gear arrangement of known hand guided and/or hand held power tools as a main source for noise emission, weight, size and maintenance requirements. All hand guided and/or hand held electric power tools known in the art so far use mechanical gear arrangements with meshing teeth of gearwheels in order to transmit the rotational movement and torque from the rotating motor shaft into the rotational working movement of the working element. These mechanical gear arrangements have the disadvantage of mechanical wear, noise emission, need for lubrication and cooling, relatively large dimensions and relatively high weight. All these drawbacks can be overcome by the electric power tool according to the present invention. By using only magnetic gear arrangements in a power tool a giant leap in the design of hand guided and/or hand held power tools has been achieved. The power tool according to the present invention provides for a significant advantage in terms of durability, low-maintenance and noise reduction. Of course, the advantages also apply if only one of the gear arrangements within a power tool are realized as a magnetic gear arrangement.

According to a first preferred embodiment of the invention the electric motor is of the outrunner type having an internal stator with the electrical windings and an outer rotor with the permanent magnets mounted thereon. In electric machines with electric motors of the outrunner type the first rotating component of the magnetic gear arrangement formed by the extended part of the rotor together with the first number of magnetic pole pairs is located radially outside of the second inner component with the second number of magnetic pole pairs. The third intermediate component with the third number of ferromagnetic pole pieces is located between the first outer component and the second inner component.

Preferably, the third intermediate component with the third number of ferromagnetic pole pieces is held static and the second inner component with the second number of magnetic pole pairs is rotatable about the rotational axis. In that case, advantageously the second rotating inner component is connected to a tool shaft or an intermediate shaft of the power tool in a torque proof manner. The tool shaft may be directly or indirectly (e.g. by means of a hypocycloid gear arrangement for realizing a gear-driven (or roto-orbital) working movement or by means an eccentric element for realizing a random-orbital working movement) to the working element. The intermediate shaft may be connected directly or indirectly (e.g. by means of a bevel gear arrangement) to the tool shaft.

Alternatively, the second inner component with the second number of magnetic pole pairs is held static and the third intermediate component with the third number of ferromagnetic pole pieces is rotatable about the rotational axis. In that case, advantageously the third rotating intermediate component is connected to a tool shaft or an intermediate shaft of the power tool in a torque proof manner. Again, the tool shaft may be directly or indirectly (e.g. by means of a hypocycloid gear arrangement for realizing a gear-driven (or roto-orbital) working movement or by means an eccentric element for realizing a random-orbital working movement) to the working element. The intermediate shaft may be connected directly or indirectly (e.g. by means of a bevel gear arrangement) to the tool shaft.

According to a first preferred embodiment of the invention the electric motor is of the inrunner type having an outer stator with the electrical windings and an inner rotor with the permanent magnets mounted thereon. In electric machines with electric motors of the inrunner type the first rotating component of the magnetic gear arrangement formed by the extended part of the rotor together with the first number of magnetic pole pairs is located radially inside of the second outer component with the second number of magnetic pole pairs. The third intermediate component with the third number of ferromagnetic pole pieces is located between the first rotating inner component and the second outer component.

Preferably, the second outer component with the second number of magnetic pole pairs is held static and the third intermediate component with the third number of ferromagnetic pole pieces is rotatable about the rotational axis. In that case, advantageously the third rotating intermediate component is connected to a tool shaft or an intermediate shaft of the power tool in a torque proof manner. Again the tool shaft is directly or indirectly connected to the working element and the intermediate shaft is connected directly or indirectly to the tool shaft.

Furthermore, the stator of the motor may be extended in an axial direction so as to surround the first rotating component of the magnetic gear arrangement formed by the extended part of the rotor together with the first number of magnetic pole pairs, and wherein the second number of magnetic pole pairs are mounted to the extended part of the stator. The ferromagnetic pole pieces held by the non-magnetic and non-conductive support structure are located between the first number of magnetic pole pairs and the second number of magnetic pole pairs, that is between the extended part of the rotor and the extend part of the stator. The support structure for the pole pieces is connected in a torque proof manner to the tool shaft or any intermediate shaft directly or indirectly connected to the tool shaft. This provides for a further integration of the electric motor with the components of the magnetic gear arrangement.

Preferably, the permanent magnets of the first number of magnetic pole pairs of the first rotating component are identical to the permanent magnets mounted to the rotor of the electric motor. Hence, these permanent magnets have a dual function.

Finally, it is suggested that the number ($n\_pp$) of ferromagnetic pole pieces (50) is either $n\_pp=(n\_output-n\_input)$ or $n\_pp=(n\_output+n\_input)$, wherein $n\_output$ is the second number of magnetic pole pairs 58 of the second component 54 and n_input is the first number of magnetic pole pairs 56 of the first component 52.

Further features and advantages of the present invention will become apparent from the following detailed description making reference to the accompanying drawings. These show.

Figure 1:
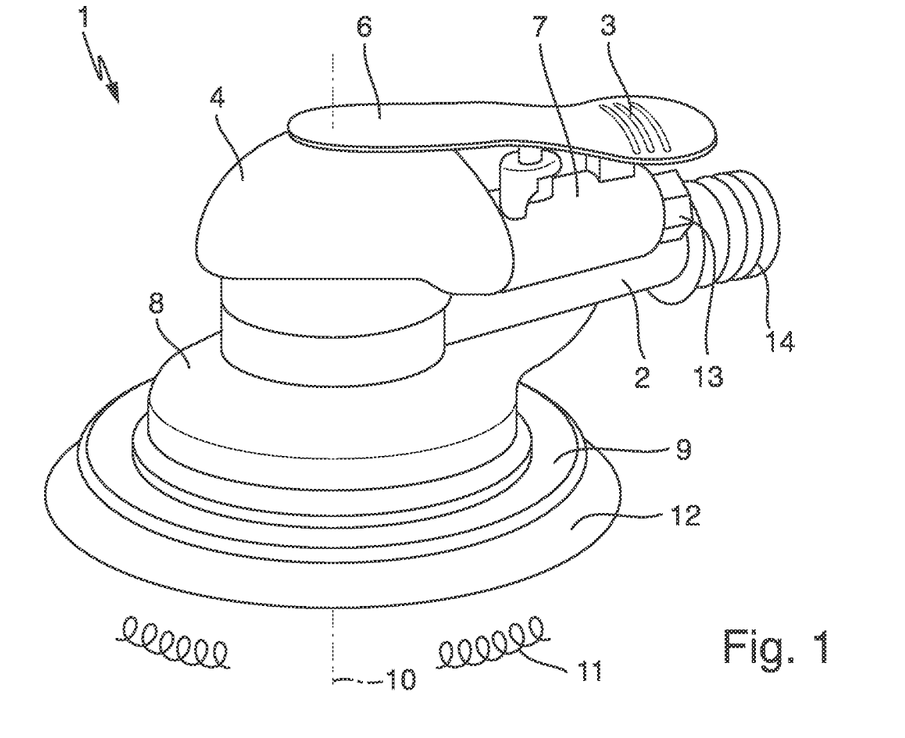
FIG. 1 a hand held and hand guided electric power tool according to the present invention.
Figure 5:
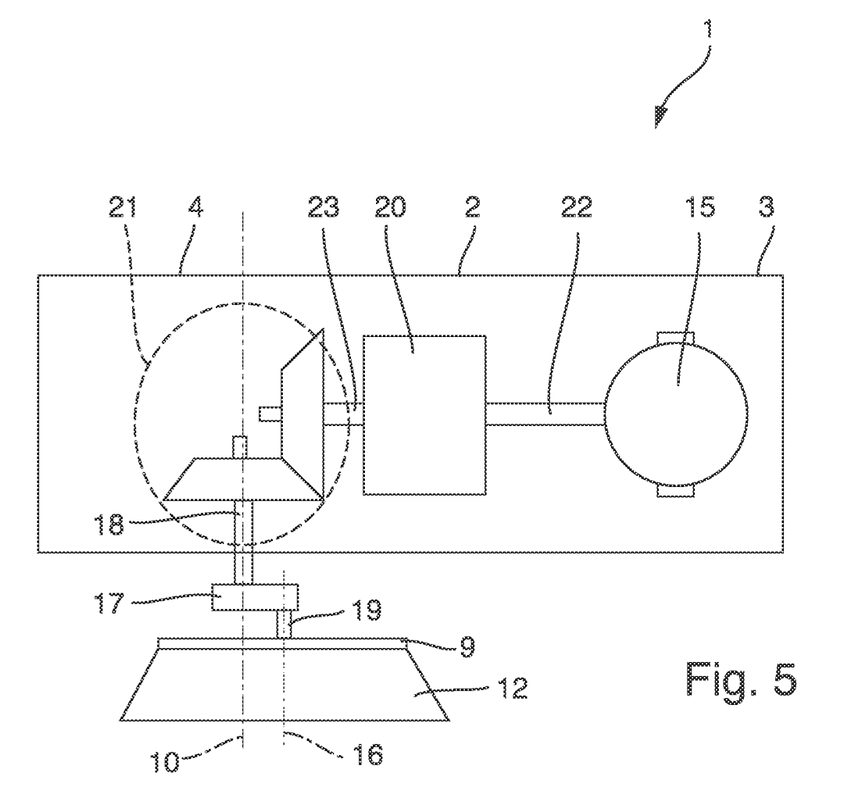
FIG. 5 a schematic longitudinal sectional view of the power tool of FIG. 1.

FIG. 1 shows an example of a hand held and hand guided electric power tool 1 according to the present invention in a perspective view. FIG. 5 shows a schematic longitudinal section through the power tool 1 of FIG. 1. The power tool 1 is embodied as a random orbital polishing machine (or polisher). The polisher 1 has a housing 2, essentially made of a plastic material. The housing 2 is provided with a handle 3 at its rear end and a grip 4 at its front end in order to allow a user of the tool 1 to hold the tool 1 and apply a certain amount of pressure on the top of the front end of the housing 2 during the intended use of the tool 1. At the bottom side of the handle 3 a switch 6 is provided for activating and deactivating the power tool 1. The switch 6 may be held in its on-position by means of a push-button 7. The power tool 1 can be provided with adjustment means (e.g. a turn wheel) for adjusting the rotational speed of the tool's electric motor 15 (see FIG. 5) located inside the housing 2. The adjustment means are not shown in the figures. The housing 2 can be provided with venting openings 8 for allowing the dissipation of heat from the inside of the housing 2. The heat may be created by the electronic components (e.g. ECU, motor 15, etc.) located inside the housing 2. At a rear side of the housing 2 a power cord 5 with a plug (not shown) at its distal end is provided for connecting the power tool 1 to a mains power supply. Of course, the power tool 1 could also be operated with electric power from a battery, possibly rechargeable or exchangeable, located at least partly inside the housing 2.

The power tool 1 has a disk-like working element 9 (or backing pad) rotatable about a rotational axis 10. In particular the working element 9 of the tool 1 shown in FIG. 1 performs a random orbital or a roto-orbital (gear driven) movement 11. With the random orbital movement 11 the working element 9 performs a first rotational movement about a first rotational axis corresponding to rotational axis 10. Spaced apart from and extending parallel to the first rotational axis 10 a second axis 16 (see FIG. 5) is defined about which the working element 9 is freely rotatable independently from the rotation of the working element 9 about the first rotational axis 10. The second axis 16 runs through the balance point of the working element 9. The random orbital movement 11 is realized by means of an eccentric element 17 attached to a tool shaft 18 in a torque proof manner and in which a rotational shaft 19 of the working element 9 is held and guided freely rotatable about axis 16.

With the roto-orbital movement, the rotation of the working element 9 about the second axis 16 is forced by a gearing mechanism (not shown) depending on the rotation about the first axis 10. For example, for a rotational about the first rotational axis 10 by 360° (one rotation), the working element 9 may be forced to perform a plurality of gear driven rotations (approximately 30 to 120 rotations) about the second rotational axis 16.

The bottom surface of the working element 9 is provided with means for releasably attaching a tool accessory 12 for performing a desired work which the power tool 1 is adapted for. For example in the case the tool 1 was a polisher, the tool accessory 12 may be a polishing material comprising but not limited to a foam or sponge pad, a microfiber pad, and a real or synthetic lambs' wool pad. In FIG. 1 the tool accessory 12 is embodied as a sponge or foam pad. The attachment means for attaching the tool accessory 12 to the bottom surface of the working element 9 can comprise a first layer of a hook-and-loop fastener (or Velcro®) on the bottom surface of the working element 9, wherein the top surface of the tool accessory 12 is provided with the corresponding second layer of the hook-and-loop fastener. The two layers of the hook-and-loop fastener interact with one another in order to releasably but safely fix the tool accessory 12 to the bottom surface of the working element 9. Of course, with other types of power tools 1, the working element 9 and the tool accessory 12 may be embodied and connected to each other in a different manner. The power tool 1 according to the present invention can be any type of power tool provided with a working element 9 performing some kind of working movement (purely rotational, roto-orbital (gear driven), random orbital or purely orbital).

The working element 9 is made of a semi-rigid material, preferably a plastic material, which on the one hand is rigid enough to carry and support the tool accessory 12 during the intended use of the power tool 1 and to apply a force to the working element 9 and the tool accessory 12 in a direction downwards and essentially parallel to the working element's rotational axis 10 and which on the other hand is flexible enough to avoid damage or scratching of a surface to be worked by the working element 9 or the tool accessory 12, respectively.

The power tool 1 according to the invention comprises at least one magnetic gear arrangement functionally located between the pneumatic motor 15 and the working element 9 for transmitting a rotation and torque from a motor shaft 22 into a corresponding rotation of the working element 9, thereby possibly reducing the number of rotations and enhancing the torque. In the embodiment shown in FIG. 5 two magnetic gear arrangements are provided, one being a coaxial magnetic gear arrangement 20 and the other being a magnetic bevel gear arrangement 21.

The coaxial gear arrangement 20 is adapted for transmitting a rotational movement of the motor shaft 22 and torque from the motor 15 to an intermediate shaft 23, thereby preferably reducing the rotational speed of the intermediate shaft 23 in respect to the motor shaft 22 and enhancing the torque. The motor shaft 22 forms the input shaft and the intermediate shaft 23 the output shaft of the coaxial gear arrangement 20.

The bevel gear arrangement 21 is provided because the power tool 1 is of an angular type, where a motor shaft 22 runs in a certain angle (preferably between 90° and less than 180°) in respect to the tool shaft 18. In the shown embodiment the angle is exactly 90°. The magnetic bevel gear arrangement 21 can also be adapted for reducing or enhancing the rotational speed of the tool shaft 18 in respect to the intermediate shaft 23. In that case the coaxial gear arrangement 20 could also be omitted. The intermediate shaft 23 forms the input shaft and the tool shaft 18 the output shaft of the bevel gear arrangement 21.

The design of a conventional coaxial magnetic gear arrangement 20 will be explained in further detail below making reference to FIGS. 2 to 4. According to the present invention the magnetic gear arrangement 20 is at least partly integrated into the electric motor 15, preferably located within the housing of the electric motor 15. Alternatively, at least part of the electric motor 15 may form part of the coaxial magnetic gear arrangement 20.

In general, a magnetic gear arrangement 20, 21 uses magnetic fields to transmit rotational movement and torque from the motor 15 to the working element 9 without mechanical contact, in order to realize the desired working movement 11 of the working element 9. The magnetic gear arrangements 20, 21 use permanent magnets to transmit torque between the respective input and output shafts. Torque densities comparable with mechanical gears can be achieved with an efficiency of 99% or better at full load and much higher efficiencies in part-load conditions than mechanical gears can achieve. Since there is no contact between the moving parts, there is no wear and no need for lubrication. Unlike mechanic gear arrangements, magnetic gear arrangements 20, 21 have a constantly high performance over time. Also they provide for a noise reduction and have the further advantage that due to the fact that driving and driven parts of the gear arrangements 20, 21 are not in direct contact with one another any vibrations caused by the rotating working element 9 during the intended use of the power tool 1 are extenuated and not transmitted to the housing 2 with the handle 3 and the grip 4, thereby providing for an even and smooth operation and a very comfortable use of the power tool 1. Magnetic gear arrangements 20, 21 also protect against overloads by slipping harmlessly if an excessive torque is applied, and automatically and safely re-engage when the excess torque is removed.

Figure 2:
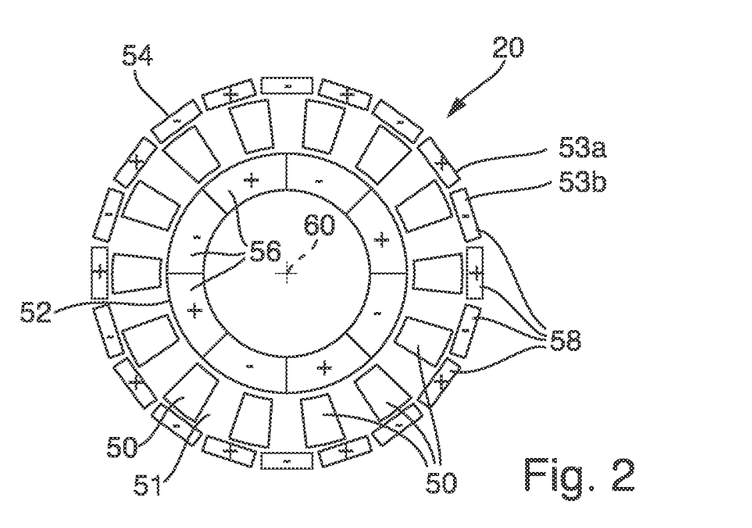
FIG. 2 a schematic cross sectional view of a magnetic gear arrangement for explaining its basic functioning.
Figure 3:
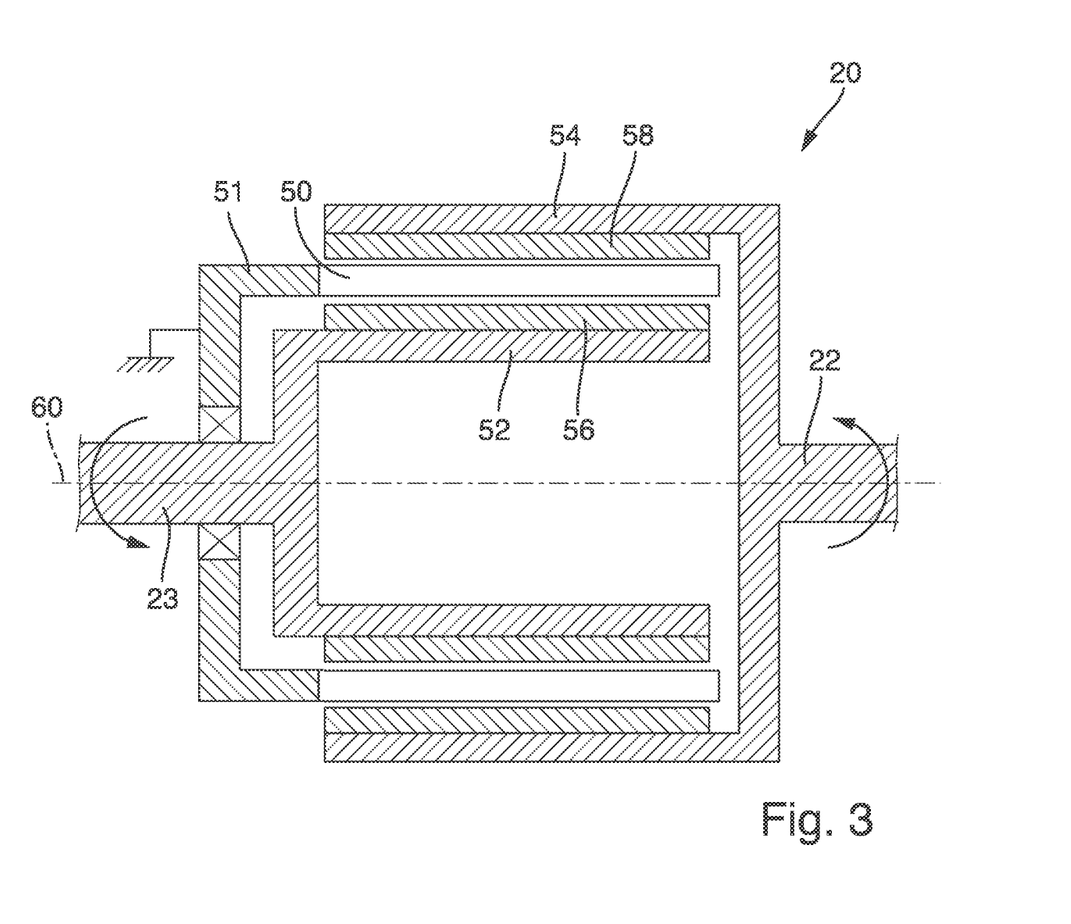
FIG. 3 a schematic longitudinal sectional view of the magnetic gear arrangement of FIG. 2.

A preferred embodiment of a coaxial magnetic gear arrangement 20 is shown in FIGS. 2 and 3. The gear arrangement 20 uses a series of ferromagnetic (e.g. steel) segments or pole-pieces 50 to modulate magnetic fields produced by two rotating permanent magnet components 52, 54 with different numbers of permanent magnets 56, 58 (pole pairs each comprising two magnets of opposing polarities). The magnets 56, 58 are located on the components 52, 54 next to each other with alternating polarities in a circumferential direction. The pole pieces 50 are preferably supported by a non-magnetic and non-conductive structure 51. The inner component 52 is preferably connected to the fast rotating input or motor shaft 22 in a torque proof manner. The outer component 54 is preferably connected to the output or intermediate shaft 23 in a torque proof manner. The pole-pieces 50 and the support structure 51 are static (see FIG. 3). In this arrangement the magnet arrays of the outer and inner components 52, 54 rotate at different speeds, with the gear ratio determined by the ratio of magnetic pole pairs 56, 58 in each array. In the embodiment of FIG. 2 the gear arrangement 20 has a gear ratio of 10:4 or 5:2, respectively (i=n_output/n_input=10/4), n_output being the number of magnetic pole pairs 58 on the second component 54 and n_input being the number of magnetic pole pairs 56 on the first component 52. Other gear ratios of 50:1 down to 1.01:1 with almost zero torque ripple can be achieved, too. A common rotational axis of the inner component 52 as well as of the outer component 54 is indicated with reference sign 60. Of course, the rotational axes of the two components 52, 54 do not necessarily have to run coaxially but may run parallel to and slightly spaced apart from each other. In this embodiment the magnetic flux is transmitted in a radial direction.

Alternatively to what is shown in FIG. 3, it is also possible that the inner component 52 is connected to the motor shaft 22, the intermediate component comprising the support structure 51 and the pole pieces 50 is connected to the output or intermediate shaft 23 and the outer component 54 is held stationary, for example by being fixed to the housing 2 of the power tool 1 or by forming part of the housing 2.

Generally speaking, the at least one coaxial magnetic gear arrangement 20 has three principle components 50, 52, 54, all three of which may rotate relative to each other about the rotational axis 60. It is noted that a relative rotation of the component 50, 52, 54 in respect to one another is also given, if one of the components is stationary. A radially inner component 52 of the three components generates a first magnetic field with a first number of pole pairs 56 each pole pair comprising two magnets of opposing polarity. A radially outer component 54 of the three components generates a second magnetic field with a second number of pole pairs 58 each pole pair comprising two magnets of opposing polarity. In order to provide for a gear ratio #1, the number of magnetic pole pairs 56, 58 of the two rotors 52, 54 has to be different. A radially intermediate component of the three components has a number of ferromagnetic pole pieces 50 supported by the non-magnetic and non-conductive support structure 51. The third component 50, 51 acts as a passive part of a magnetic circuit between the first component 52 and the second component 54. Preferably, in order to realize a constant gear ratio, one of the components is connected to the input shaft 22, another one of the components is connected to the output shaft 23 and the third component is maintained stationary.

There is no physical contact between any of the driving and driven parts 52, 54 as the motion is transferred across an air gap using the force of the magnetic fields. The intermediate component comprising the pole pieces 50 and the ring-shaped support structure 51 is located in the air gap between the inner ring 52 and the outer ring 54 resulting in a first air gap 53a (see FIG. 2) between the support structure 51 with the pole pieces 50 and the outer ring 54 and in a second air gap 53b between the support structure 51 with the pole pieces 50 and the inner ring 52. These air gaps allow the magnetic gear arrangement 20 to work without lubrication and provides for a quiet and smooth operation.

The magnetic gear arrangement 20 works as follows: By rotating the inner magnet component 52 with the steel segments 50 not yet inserted into the air gap the magnetic field produced by the magnets 56 has an array of four north and south poles rotating at the same speed. After introduction of the steel segment ring 50, 51 into the air gap, this field pattern is considerably altered. The outer magnetic ring 54 consists of a larger number of (in the embodiment of FIG. 2: ten) pole pairs of north and south magnets 58. These couple with the altered magnetic field generated by the inner magnets 56 and rotate at a lower speed in the opposite direction than the inner ring 52. If the outer magnet ring 54 was stationary and the intermediate ring with the ferromagnetic segments 50 was rotatable about the axis 60, it would rotate at the lower speed in the same direction as the inner ring 52.

Figure 4:
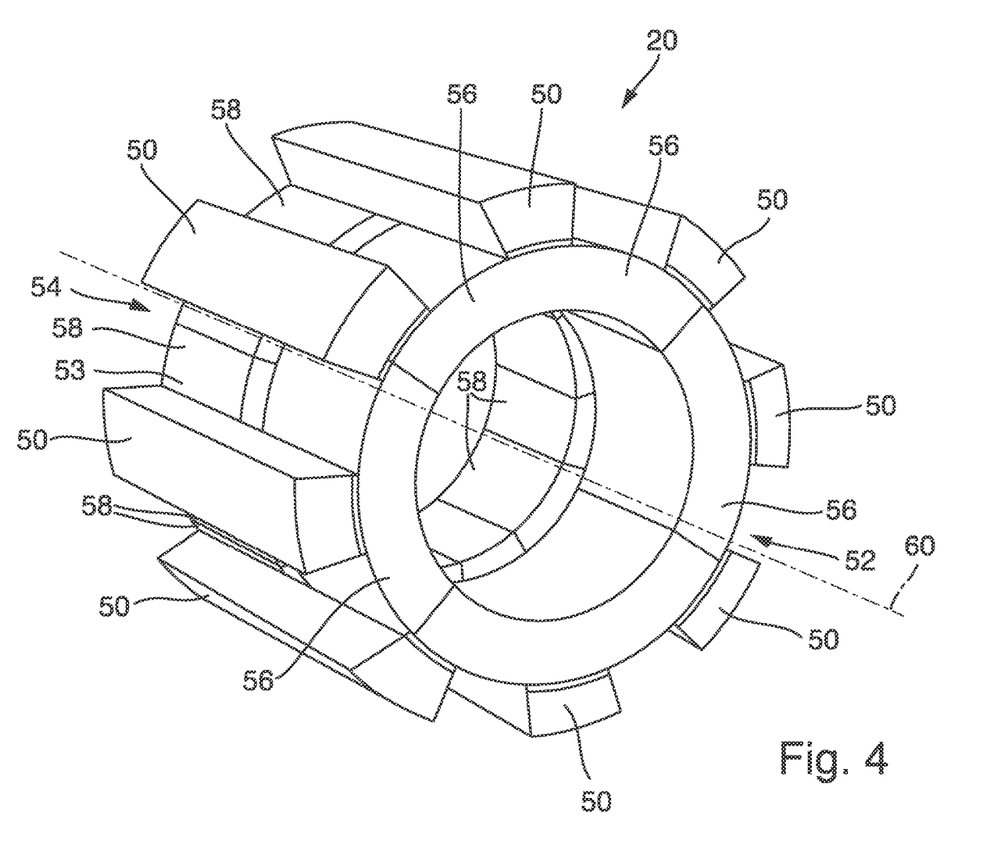
FIG. 4 a further embodiment of a magnetic gear arrangement.

Another embodiment of a coaxial magnetic gear arrangement 20 is shown in FIG. 4. It comprises a first ring-shaped component 52 with a first number of permanent magnets 56 disposed along its circumference with alternating polarities. In this example, the first component 52 is provided with a total of four magnets 56 (two pole pairs each comprising one magnet 56 with positive polarity and one magnet 56 with negative polarity), the polarities alternating along the circumference of the first ring 52. Furthermore, the gear arrangement 20 of FIG. 4 comprises a second ring-shaped component 54 with a second number of permanent magnets 58 disposed along its circumference with alternating polarities. In this example, the second ring 54 is provided with a total of twelve magnets 58 (six pole pairs each comprising one magnet 58 with positive polarity and one magnet 58 with negative polarity), the polarities alternating along the circumference of the second ring 54. The two components 52, 54 are located coaxially, and are rotatable independently about the same rotational axis 60. The second component 54 with the second number of pole pairs 58 is located axially displaced along the common rotational axis 60 in respect to the first component 52 with the first number of pole pairs 56. An airgap 53 is provided between two sides of the components 52, 54 facing each other, the airgap 53 extending in a plane perpendicular in respect to the rotational axis 60.

Surrounding the two components 52, 54 externally are ferromagnetic segments 50 each having a longitudinal extension along the axis 60. The segments 50 may be held by a support structure 51 (not shown in FIG. 4). Preferably, the segments 50 extend along the entire length of the two components 52, 54 and the permanent magnets 56, 58 in the direction of the axis 60. The number n_pp of ferromagnetic pole pieces 50 is preferably either n_pp=(n_output-n_input) or n_pp=(n_output+n_input). In this embodiment the number n_pp is preferably (6−2=4) or (6+2=8). In this example there are eight ferromagnetic segments 50 provided along the outer circumference of the two rings 52, 54. Preferably, the segments 50 are equidistantly spaced apart from one another in a circumferential direction. In this example the magnetic gear arrangement 20 has a gear ratio of 3:1 (i=6 pole pairs/2 pole pairs). Air gaps are provided between the outer circumferential surfaces of the two components 52, 54 and surfaces of the ferromagnetic segments 50 facing radially inwards. In this embodiment, the first component 52 (with the smaller number of magnetic pole pairs 56) is connected to the high speed motor shaft 22 and the second component 54 (with the larger number of magnetic pole pairs 58) is connected to the tool shaft 18 or any intermediate shaft 23. The magnetic flux is transmitted from the first ring 52 to the second ring 54 in a transverse direction. More in detail, the flux is transmitted radially from the first magnetic element 52 to the ferromagnetic segments 50 and also from the ferromagnetic segments 50 to the second magnetic element 54. The external ferromagnetic segments 50 provide for a transmission of the magnetic fields of the two elements 52, 54 in a manner that they interact with one another and that the second element 54 rotates with a certain number of rotations depending on the gear ratio. In this embodiment the magnetic flux is not transmitted directly between the first element 52 and the second element 54 but rather indirectly by means of the ferromagnetic elements 50.

Various examples for electric machines 300 according to the present invention will be described hereinafter making reference to FIGS. 6 to 10. An electric machine 300 comprises an electric motor 15 and a coaxial magnetic gear arrangement 20. In all embodiments of the electric machines 300 according to the present invention the electric motor 15 and the coaxial magnetic gear arrangement 20 are at least partially integrated into one another.

Figure 6:
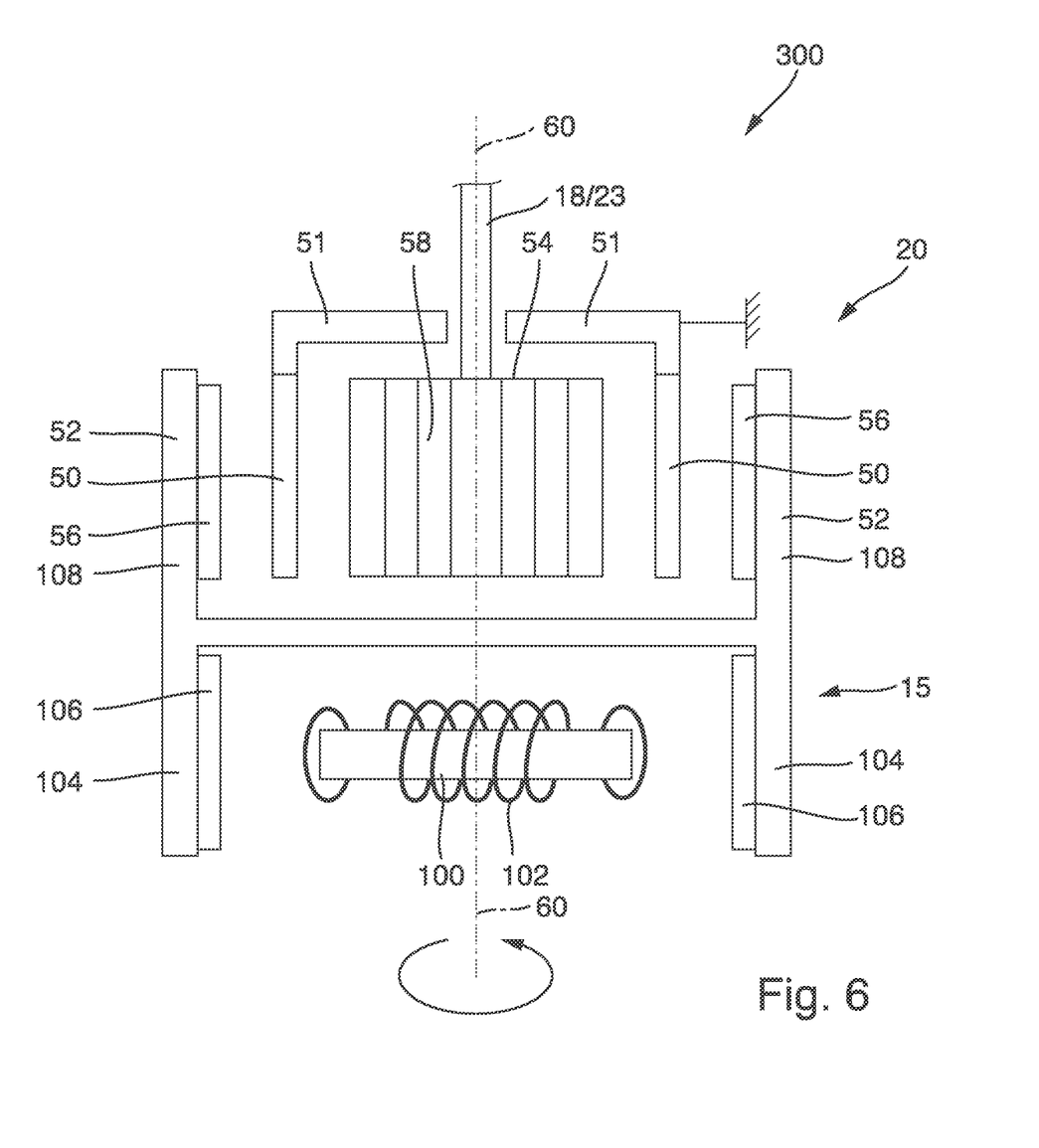
FIG. 6 a schematic longitudinal sectional view of an electric machine for use in an electric power tool according to the present invention.

In the embodiment of FIG. 6 the electric motor 15 is of the outrunner type. This means that the motor 15 has an inner stator 100 provided with a plurality of electrical windings 102. Surrounding the stator 100 is an outer rotor 104 provided with permanent magnets 106. Preferably, the rotor 104 has a cup-like shape with the permanent magnets 106 attached to an inner circumferential surface facing radially inwards towards the stator 100 and the windings 102. During operation of the electric motor 15 the windings 102 are provided with an electric current of alternating polarities thereby inducing a magnetic field of continuously alternating polarities. The permanent magnets 106 of the rotor 104 are pushed away from the magnetic field of the same polarity as the magnets 106 and are attracted by the magnetic field of opposing polarity, thereby provoking the outer rotor 104 to rotate about the rotational axis 60. The rotor 104 of the motor 15 extends in an axial direction beyond the stator 100 of the motor 15. The first number of magnetic pole pairs 56 is attached to the extended part 108 of the rotor 104 in order to make the extended part 108 of the rotor 104 together with the first number of magnetic pole pairs 56 form the first rotating component 52 of the magnetic gear arrangement 20.

Within the extended part 108 of the rotor 104 forming the first rotating component 52 of the magnetic gear arrangement 20 the second rotating component 54 is located together with the second number of magnetic pole pairs 58. Both the first rotating component 52 and the second rotating component 54 rotate about the common rotational axis 60. The third component 51 with the third number n_pp of ferromagnetic pole pieces 50 is located between the first number of magnetic pole pairs 56 of the first component 52 and the second number of magnetic pole pairs 58 of the second component 54. The third component 51 acts as a passive part of the magnetic circuit between the first and second components 52, 54 and alters the first magnetic field created by the first number of magnetic pole pairs 56. As a consequence of the first number of magnetic pole pairs 56 rotating about the rotational axis 60, the magnetic field pattern created thereby and the alteration of the magnetic field pattern through the ferromagnetic pole pieces 50, the second component 54 rotates about the rotational axis 60. Due to the fact that the first number of magnetic pole pairs 56 is smaller than the second number of magnetic pole pairs 58, the second component 54 rotates at a lower speed than the first component 52 in the opposite direction. The second component 54 may be connected to the tool shaft 18 or any intermediate shaft 23.

Figure 7:
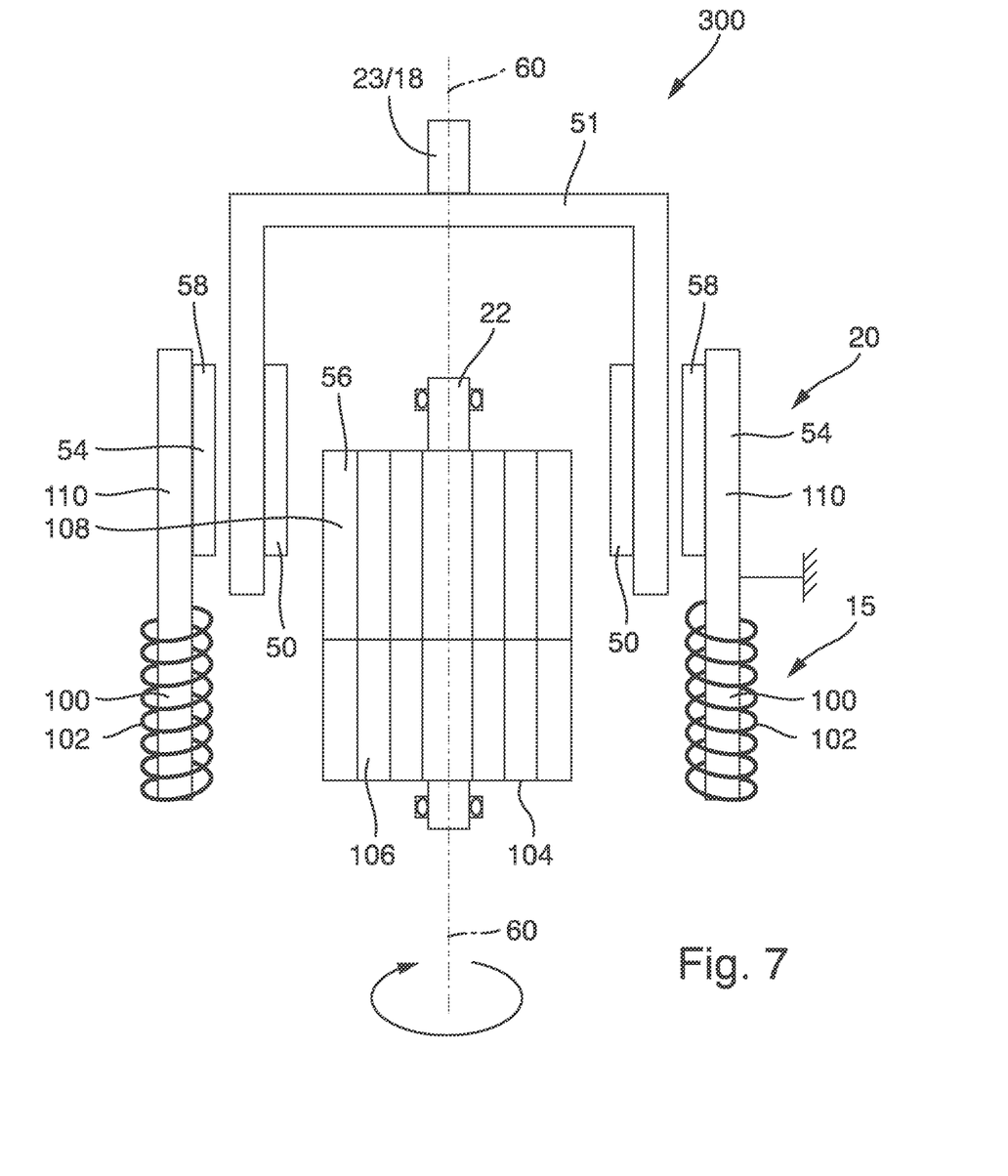
FIG. 7 a schematic longitudinal sectional view of another electric machine for use in an electric power tool according to the present invention.

In the embodiment of FIG. 7 the electric motor 15 is of the inrunner type. This means that the motor 15 has an outer stator 100 provided with a plurality of electrical windings 102. Inside the stator 100 is an inner rotor 104 provided with permanent magnets 106 rotatable about the rotational axis 60. Preferably, the rotor 104 has a cylindrical shape with the permanent magnets 106 attached to an outer circumferential surface facing radially outward towards the stator 100. During operation of the electric motor 15 the inner rotor 104 rotates about the rotational axis 60. The rotor 104 of the motor 15 extends in an axial direction beyond the stator 100 of the motor 15. The first number of magnetic pole pairs 56 is attached to the extended part 108 of the rotor 104 in order to make the extended part 108 of the rotor 104 together with the first number of magnetic pole pairs 56 form the first rotating component 52 of the magnetic gear arrangement 20.

Outside of the extended part 108 of the rotor 104 forming the first rotating component 52 of the magnetic gear arrangement 20 the second component 54 is located together with the second number of magnetic pole pairs 58. Preferably, the second component 54 is integrally formed as a single part with the stator 100. To this end the stator 100 extends in an axial direction beyond the rotor 104 of the motor 15. The second number of magnetic pole pairs 58 is attached to an inner surface of the extended part 110 of the stator 100 facing radially inwards towards the first rotating component 52 of the magnetic gear arrangement 20. The second component 54 of the magnetic gear arrangement 20 is static and does not rotate about the rotational axis 60. It is preferable, that the extended part 110 of the stator 100 has no magnetic continuation with the stator 100. The stator 100 may be made of thin sheet metal of ferrosilicon, whereas the extended part 110 may be made of a single piece of steel.

The third component 51 with the third number n_pp of ferromagnetic pole pieces 50 is located between the first number of magnetic pole pairs 56 of the first component 52 and the second number of magnetic pole pairs 58 of the second component 54. Both the first rotating component 52 and the third component 50, 51 rotate about the common rotational axis 60. The third component 51 acts as a passive part of the magnetic circuit between the first and second components 52, 54 and alters the first magnetic field created by the first number of magnetic pole pairs 56. As a consequence, the third component 50, 51 rotates about the rotational axis 60. Due to the fact that the first number of magnetic pole pairs 56 is smaller than the second number of magnetic pole pairs 58, the third component 50, 51 rotates at a lower speed than the first component 52 in the same direction. The third component 51 may be connected to the tool shaft 18 or any intermediate shaft 23.

In the embodiments of FIGS. 6 and 7 the magnetic flux is transmitted from the first component 52 to the second component 54 in a radial direction resulting in the rotation of the second component 54 (FIG. 6) or the third component 51 (FIG. 7) about the rotational axis 60 at a reduced speed in respect to the first component 52.

In the above described two embodiments of the invention, the permanent magnets 106 of the rotor 104 may be identical to the magnets 56 of the first number of magnetic pole pairs of the first rotating component 52 of the magnetic gear arrangement 20. Both embodiments provide for a highly integrated electric machine 300 integrating an electric motor 15 with a coaxial magnetic gear arrangement 20 similar to those shown in FIGS. 2 and 3. Due to the compact size and the low weight of the electric machine 300, it is particularly suited for use in an electric power tool 1. An advantage of the embodiment of FIG. 7 is that the stator windings 102 which during operation of the motor 15 create most of the heat are located at the outside of the machine 300. This allows a very easy and efficient cooling of the windings 102, e.g. by bringing them into direct thermal contact with a housing (not shown) of the machine 300 made of metal or another well heat conductive material.

Figure 8:
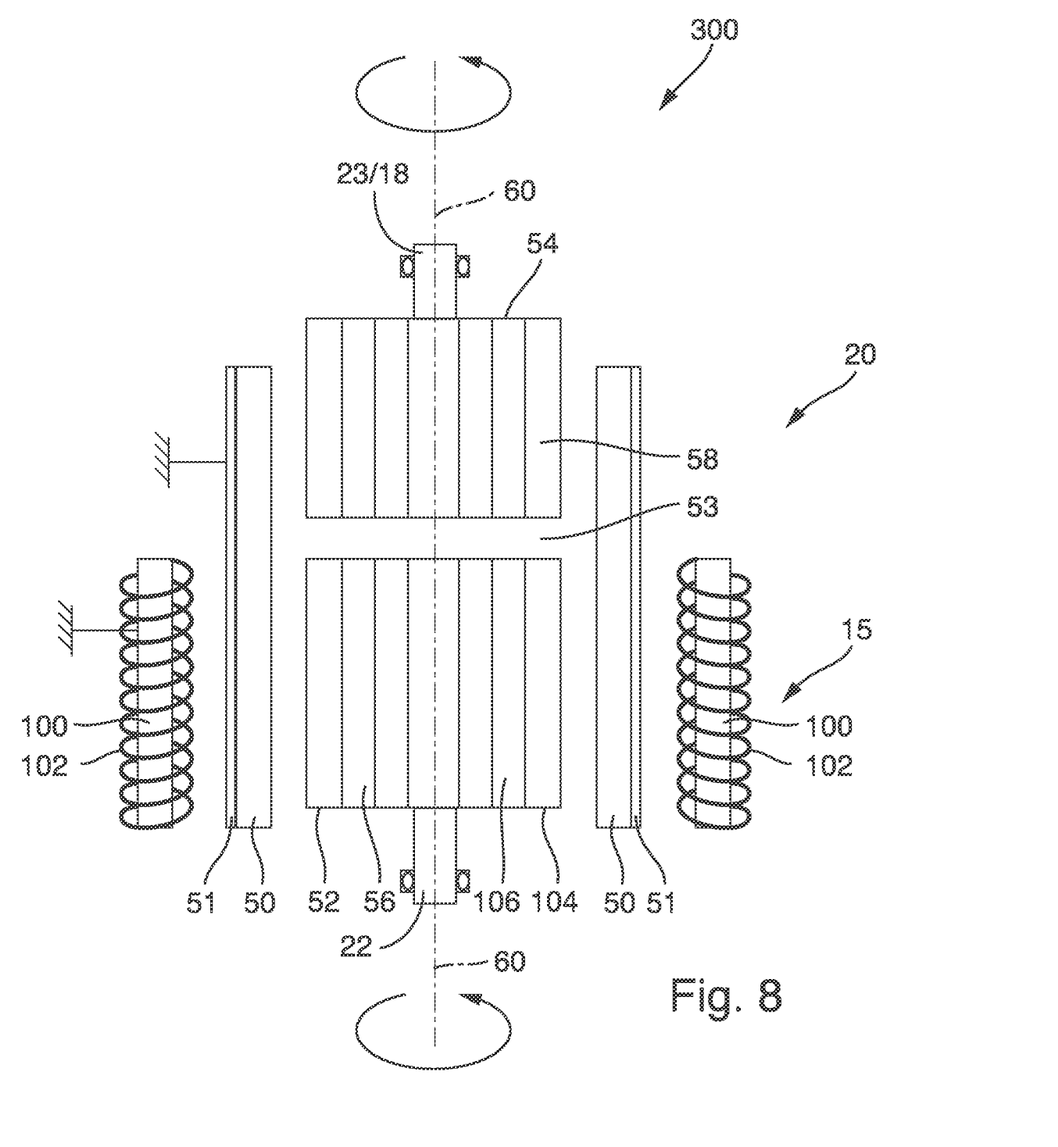
FIG. 8 a schematic longitudinal sectional view of yet another electric machine for use in an electric power tool according to the present invention.

FIG. 8 shows yet another embodiment of an electric machine 300. Again, the electric motor 15 is of the inrunner type. This means that the motor 15 has an outer stator 100 provided with a plurality of electrical windings 102. Inside the stator 100 is an inner rotor 104 provided with permanent magnets 106 (similar to what has been shown and described in respect to FIG. 7). Preferably, the rotor 104 has a cylindrical shape with the permanent magnets 106 attached to an outer circumferential surface facing radially outward towards the stator 100. During operation of the electric motor 15 the inner rotor 104 rotates about the rotational axis 60.

The rotor 104 of the motor 15 has a dual function. It does not only act as a rotor of the electric motor 15 but also as the first rotating component 52 of the magnetic gear arrangement 20. To this end the permanent magnets 106 of the rotor 104 also serve as the permanent magnets 56 of the first number of magnetic pole pairs of the first component 52. The second rotating component 54 with the second number of pole pairs 58 is located axially displaced along the common rotational axis 60 in respect to the first component 52. An airgap 53 is provided between two sides of the components 52, 54 facing each other, the airgap 53 extending in a plane perpendicular in respect to the rotational axis 60.

Surrounding the two components 52, 54 externally are ferromagnetic segments 50 each having a longitudinal extension along the axis 60. The segments 50 may be held by a support structure 51 (not shown in FIG. 8). Preferably, the segments 50 extend along the entire length of the two components 52, 54 and the permanent magnets of the magnetic pole pairs 56, 58 in the direction of the axis 60. The segments 50 are equidistantly spaced apart from one another in a circumferential direction. Air gaps are provided between the outer circumferential surfaces of the two components 52, 54 and surfaces of the ferromagnetic segments 50 facing radially inwards. The second component 54 is connected to the tool shaft 18 or any intermediate shaft 23. In this embodiment an electric motor 15 is integrated in a coaxial magnetic gear arrangement 20 of the type shown in FIG. 4.

Figure 9:
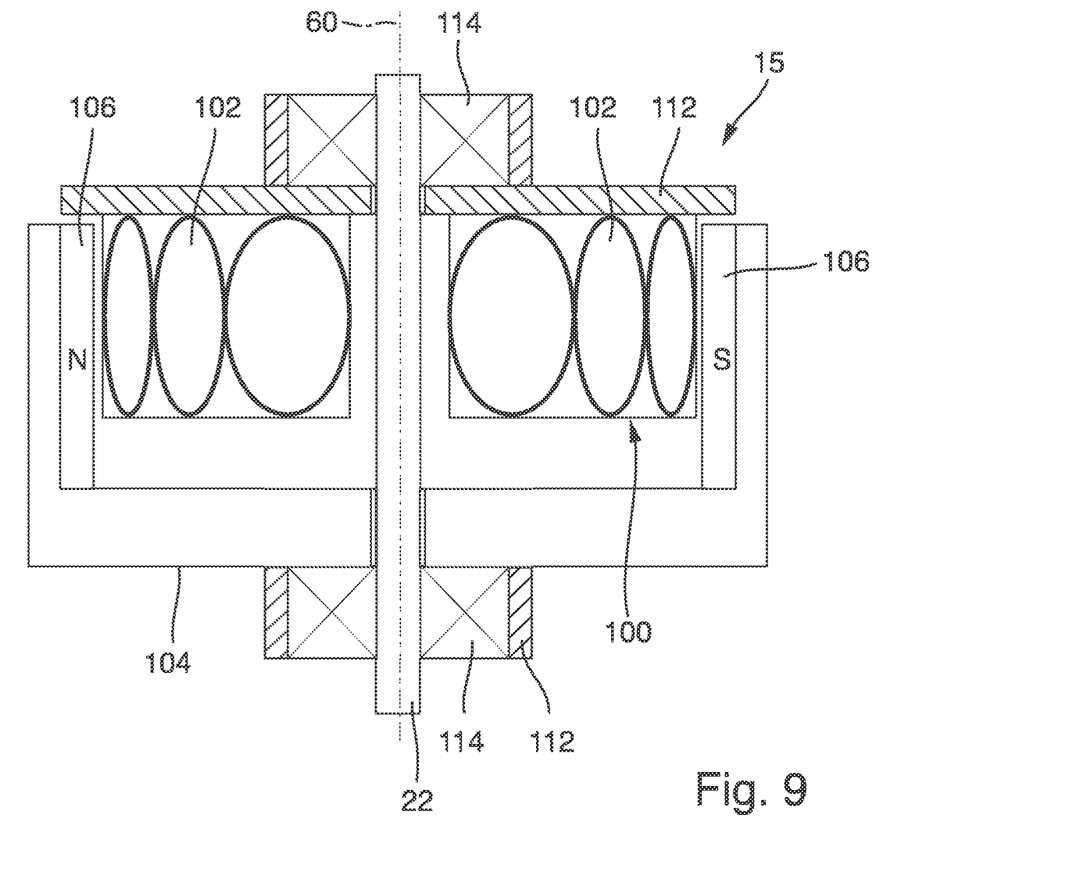
FIG. 9 a schematic longitudinal sectional view of an electric motor known in the art for use in an electric power tool.

FIG. 9 shows a conventional electric motor 15 of a type currently used in conventional power tools. The motor 15 is of the outrunner type. It comprises a static motor housing 112 with the stator 100 and the electric windings 102 attached thereto.

Furthermore, attached to the housing 112 are two bearings 114 at opposing ends of the housing 112. The motor shaft 22 is rotatably mounted to these bearings 114. A cup shaped rotor 104 with the permanent magnets 106 is fixed to the motor shaft 22 in a torque proof manner.

Figure 10:
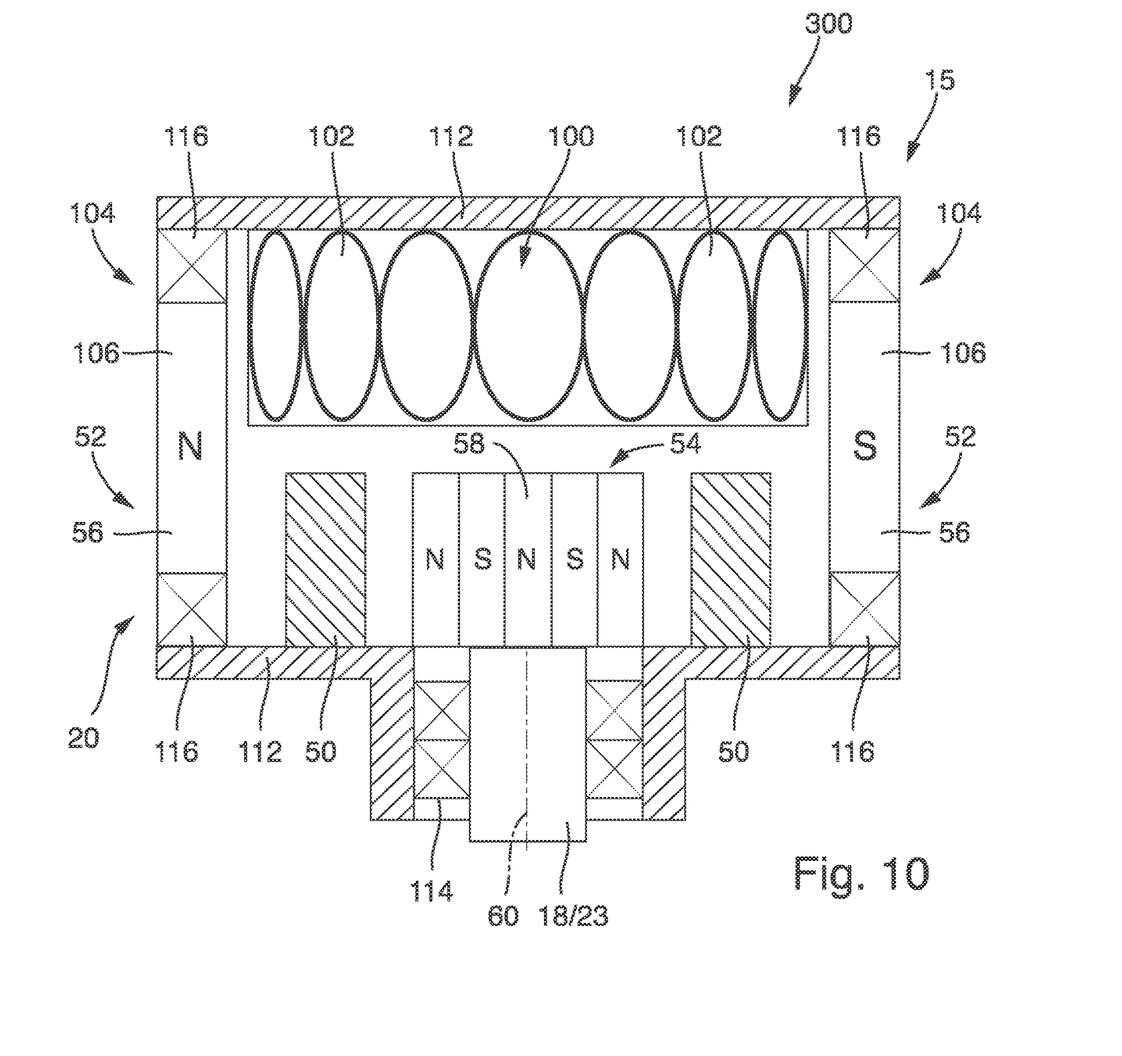
FIG. 10 a schematic longitudinal sectional view of yet another electric machine for use in an electric power tool according to the present invention.

FIG. 10 shows a further embodiment of an electric machine according to the present invention based on the electric motor 15 of FIG. 9. The stator 100 with the windings 102 is still fixed to the motor housing 112. Located radially outwards of the stator 100 is the rotor 104 with the permanent magnets 106. The rotor 104 is held in place by means of one or more bearing elements 116 and is freely rotatable in respect to the motor housing 112 about the rotational axis 60. Preferably, the bearing elements 116 have an annular shape and hold the rotor 104 in place axially as well as radially. The bearing elements 116 may be embodied as bearing rings.

The permanent magnets 106 extend axially downwards in a direction away from the stator 100 and form the permanent magnets 56 of the first component 52 of the coaxial magnetic gear arrangement 20. Hence, the rotating magnets realize the function of the magnets 106 of the rotor 104 as well as the function of the magnets 56 of the first component 52. Located radially inwards from the first component 52 the second component 54 with the permanent magnets 58 is located freely rotatable about the rotational axis 60. Preferably, the number of permanent magnets 58 of the second component 54 is larger than the number of permanent magnets 56 of the first component 52. The second component 54 is attached to the tool shaft 18 or an intermediate shaft 23 in a torque proof manner. The tool shaft 18 or the intermediate shaft 23, respectively, is mounted in the housing 112 by means of one or more bearings 114. Located between the first component 52 and the second component 54 in a radial direction are the ferromagnetic segments 50, which may be attached to the housing 112 directly or indirectly, e.g. by means of a support structure 51 (not shown in FIG. 10). The second component 54 rotates with a certain speed in respect to the speed of the first component 52 depending on the gear ratio of the magnetic gear arrangement 20. In this embodiment the motor shaft can be omitted resulting in a very compact and light weight electric machine 300.

It should be understood that, unless stated otherwise herein, any of the features, characteristics, alternatives or modifications described regarding a particular embodiment herein may also be applied, used, or incorporated with any other embodiment described herein. Also, the drawing herein is not drawn to scale.

Although the invention has been described and illustrated with respect to exemplary embodiments thereof, the foregoing and various other additions and omissions may be made therein and thereto without departing from the spirit and scope of the present invention.

The invention claimed is:

1. An electric machine (300), comprising an electric motor (15), a working element (9) realizing a working movement (11), when the electric motor (15) is activated, and at least one gear arrangement functionally located between the electric motor (15) and the working element (9) for transmitting a rotational movement and torque from the electric motor (15) to the working element (9) in order to realize the working movement (11), wherein the electric motor (15) has a stator (100) with electrical windings (102) and a rotor (104) with permanent magnets (106) mounted thereon, characterized in that the at least one gear arrangement includes, or takes the form of a magnetic gear arrangement (20) using magnetic fields to transmit the rotational movement and torque from the electric motor (15) to the working element (9) without mechanical contact, the magnetic gear arrangement (20) having three principle components (51, 52, 54) which rotate relative to each other about a rotational axis (60), the three principle components (51, 52, 54) comprising a first rotating component (52) generating a first magnetic field with a first number (n_input) of magnetic pole pairs (56), a second rotating component (54) generating a second magnetic field with a second number (n_output) of pole pairs (58), and a third rotating component (51) having a third number (n_pp) of ferromagnetic pole pieces (50), the third rotating component (50, 51) acting as a passive part of a magnetic circuit between the first rotating component (52) and the second rotating component (54), that the rotor (104) of the electric motor (15) extends in an axial direction beyond the stator (100) of the electric motor (15), wherein the first number (n_input) of magnetic pole pairs (56) is provided on an extended part (108) of the rotor (104) in order to make the extended part (108) of the rotor (104) together with the first number (n_input) of magnetic pole pairs (56) form the first rotating component (52) of the magnetic gear arrangement (20).

2. The electric machine (300) of claim 1, wherein the electric motor (15) is an outrunner type having an internal stator (100) with the electrical windings (102) and an outer rotor (104) with the permanent magnets (106) mounted thereon.

3. The electric machine (300) of claim 2, wherein the first rotating component (52) of the magnetic gear arrangement (20) formed by the extended part (108) of the rotor (104) together with the first number (n_input) of magnetic pole pairs (56) is located radially outside of a second rotating inner component (54) with the second number (n_output) of magnetic pole pairs (58), and a third rotating intermediate component (51) with the third number (n_pp) of ferromagnetic pole pieces (50) is located between a first rotating outer component (52) and the second rotating inner component (54).

4. The electric machine (300) of claim 3, wherein the third rotating intermediate component (51) with the third number (n_pp) of ferromagnetic pole pieces (50) is held static and the second rotating inner component (54) with the second number (n_output) of magnetic pole pairs (58) is rotatable about the rotational axis (60).

5. The electric machine (300) of claim 4, wherein the second rotating inner component (54) is connected to a tool shaft (18) or an intermediate shaft (23) of a power tool (1) in a torque proof manner, wherein the tool shaft (18) is directly or indirectly connected to the working element (9) and the intermediate shaft (23) is connected directly or indirectly to the tool shaft (18).

6. The electric machine (300) of claim 3, wherein the second rotating inner component (54) with the second number (n_output) of magnetic pole pairs (58) is held static and the third rotating intermediate component (51) with the third number (n_pp) of ferromagnetic pole pieces (50) is rotatable about the rotational axis (60).

7. The electric machine (300) of claim 6, wherein the third rotating intermediate component (51) is connected to a tool shaft (18) or an intermediate shaft (23) of a power tool (1) in a torque proof manner, wherein the tool shaft (18) is directly or indirectly connected to the working element (9) and the intermediate shaft (23) is connected directly or indirectly to the tool shaft (18).

8. The electric machine (300) of claim 1, wherein the electric motor (15) is an inrunner type having an outer stator (100) with the electrical windings (102) and an inner rotor (104) with the permanent magnets (106) mounted thereon.

9. The electric machine (300) of claim 8, wherein the first rotating component (52) of the magnetic gear arrangement (20) formed by the extended part (108) of the rotor (104) together with the first number (n_input) of magnetic pole pairs (56) is located radially inside of a second rotating outer component (54) with the second number (n_output) of magnetic pole pairs (58), and the third rotating intermediate component (51) with the third number (n_pp) of ferromagnetic pole pieces (50) is located between a first rotating inner component (52) and a second rotating outer component (54).

10. The electric machine (300) of claim 9, wherein the second rotating outer component (54) with the second number (n_output) of magnetic pole pairs (58) is held static and the third rotating intermediate component (51) with the third number (n_pp) of ferromagnetic pole pieces (50) is rotatable about the rotational axis (60).

11. The electric machine (300) of claim 10, wherein the third rotating intermediate component (51) is connected to a tool shaft (18) or an intermediate shaft (23) of a power tool (1) in a torque proof manner, wherein the tool shaft (18) is directly or indirectly connected to the working element (9) and the intermediate shaft (23) is connected directly or indirectly to the tool shaft (18).

12. The electric machine (300) of claim 8, wherein the stator (100) of the electric motor (15) is extended in an axial direction so as to surround the first rotating component (52) of the magnetic gear arrangement (20) formed by the extended part (108) of the rotor (104) together with the first number (n_input) of magnetic pole pairs (56), and wherein the second number (n_output) of magnetic pole pairs (58) are mounted to the extended part (110) of the stator (100).

13. The electric machine (300) of claim 2, wherein the permanent magnets of the first number of magnetic pole pairs (56) of the first rotating component (52) are identical to the permanent magnets (106) mounted to the rotor (104) of the electric motor (15).

14. The electric machine (300) of claim 1, wherein the number (n_pp) of ferromagnetic pole pieces (50) is either n_pp=(n_output−n_input) or n_pp=(n_output+n_output).

15. An electric hand held and/or hand guided power tool (1), comprising an electric motor (15), a working element (9) realizing a working movement (11) when the electric motor (15) is activated, and at least one gear arrangement functionally located between the electric motor (15) and the working element (9) for transmitting a rotational movement and torque from the electric motor (15) to the working element (9) in order to realize the working movement (11), wherein the electric motor (15) has a stator (100) with electrical windings (102) and a rotor (104) with permanent magnets (106) mounted thereon, characterized in that the at least one gear arrangement includes, or takes the form of, a magnetic gear arrangement (20) and that the electric hand held and/or hand guided power tool (1) comprises the electric machine (300) according to claim 1, wherein the electric machine (300) comprises the electric motor (15) and the magnetic gear arrangement (20).

16. The electric machine (300) of claim 9, wherein the stator (100) of the electric motor (15) is extended in an axial direction so as to surround the first rotating component (52) of the magnetic gear arrangement (20) formed by the extended part (108) of the rotor (104) together with the first number (n_input) of magnetic pole pairs (56), and wherein the second number (n_output) of magnetic pole pairs (58) are mounted to the extended part (110) of the stator (100).

17. The electric machine (300) of claim 3, wherein the permanent magnets of the first number of magnetic pole pairs (56) of the first rotating component (52) are identical to the permanent magnets (106) mounted to the rotor (104) of the electric motor (15).

18. The electric machine (300) of claim 2, wherein the number (n_pp) of ferromagnetic pole pieces (50) is either n_pp=(n_output−n_input) or n_pp=(n_output+n_input).

19. An electric hand held and/or hand guided power tool (1), comprising an electric motor (15), a working element (9) realizing a working movement (11) when the electric motor (15) is activated, and at least one gear arrangement functionally located between the electric motor (15) and the working element (9) for transmitting a rotational movement and torque from the electric motor (15) to the working element (9) in order to realize the working movement (11), wherein the electric motor (15) has a stator (100) with electrical windings (102) and a rotor (104) with permanent magnets (106) mounted thereon, characterized in that the at least one gear arrangement includes, or takes the form of, a magnetic gear arrangement (20) and that the electric hand held and/or hand guided power tool (1) comprises the electric machine (300) according to claim 2, wherein the electric machine (300) comprises the electric motor (15) and the magnetic gear arrangement (20).

20. An electric hand held and/or hand guided power tool (1), comprising an electric motor (15), a working element (9) realizing a working movement (11) when the electric motor (15) is activated, and at least one gear arrangement functionally located between the electric motor (15) and the working element (9) for transmitting a rotational movement and torque from the electric motor (15) to the working element (9) in order to realize the working movement (11), wherein the electric motor (15) has a stator (100) with electrical windings (102) and a rotor (104) with permanent magnets (106) mounted thereon, characterized in that the at least one gear arrangement includes, or takes the form of, a magnetic gear arrangement (20) and that the electric hand held and/or hand guided power tool (1) comprises the electric machine (300) according to claim 3, wherein the electric machine (300) comprises the electric motor (15) and the magnetic gear arrangement (20).

* * * * *